Aug. 27, 1935.  C. R. BOOTHBY  2,012,417
MOTOR SUPPORT
Filed Oct. 14, 1933
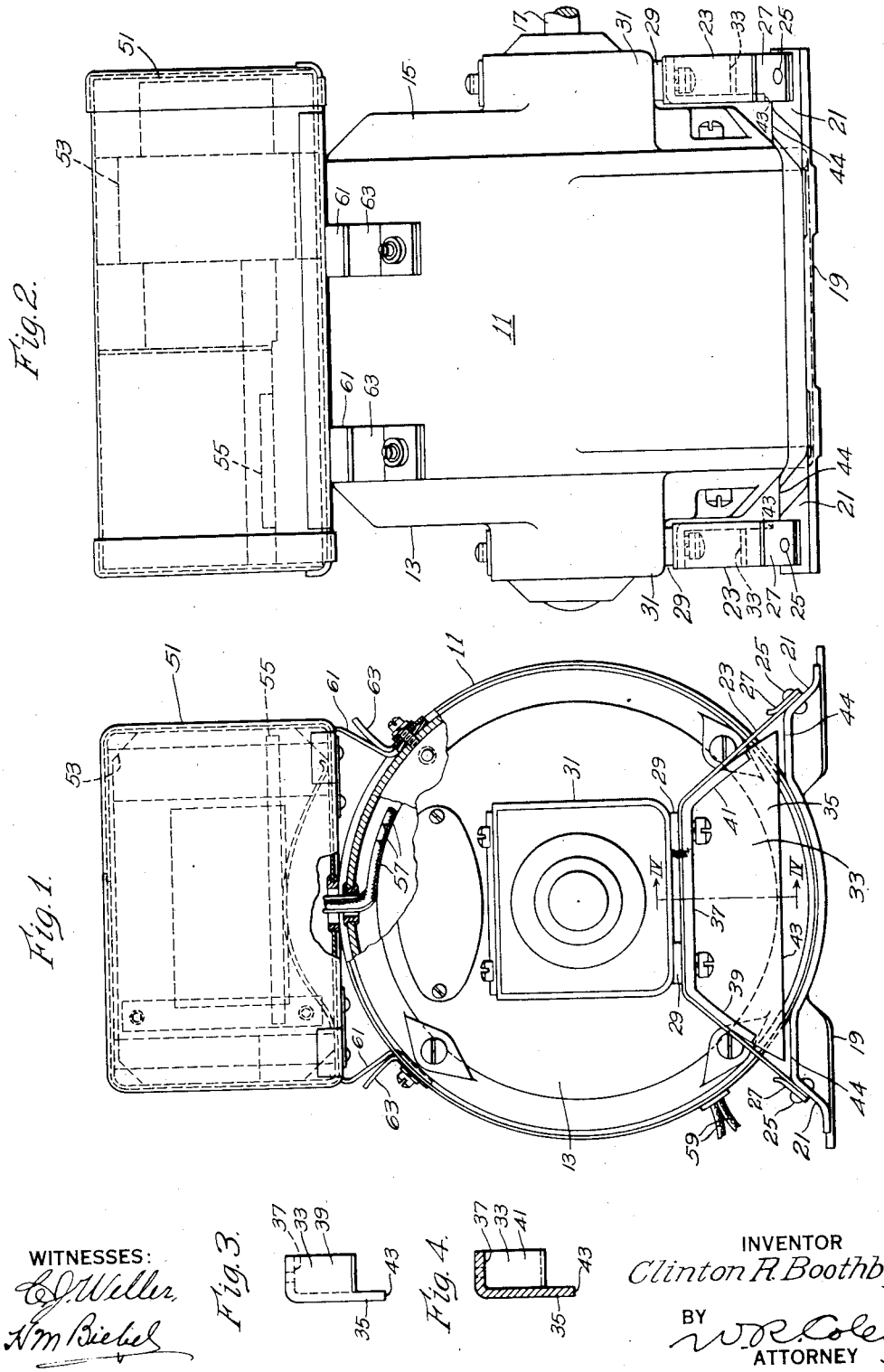
WITNESSES:
INVENTOR
Clinton R. Boothby.
BY
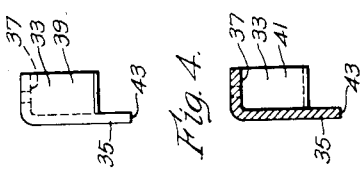
ATTORNEY Patented Aug. 27, 1935

2,012,417

UNITED STATES PATENT OFFICE 2,012,417

MOTOR SUPPORT

Clinton R. Boothby, Springfield, Mass., assignor to Westinghouse Electric & Manufacturing Company, East Pittsburgh, Pa., a corporation of Pennsylvania Application October 14, 1933, Serial No. 693,577

3 Claims. (Cl. 248—26)

My invention relates to electric motors and particularly to resiliently supported dynamo-electric machines.

It is an object of my invention to provide means in cooperation with resilient supporting means for motors subject to angular oscillations to limit the extent thereof.

In practicing my invention I provide means in cooperation with a resilient supporting means for single-phase motors subject to angular oscillations during operation to limit such oscillations.

In the single sheet of drawing:

Figure 1 is a view in end elevation of a small single-phase alternating-current capacitor motor embodying my invention;

Fig. 2 is a view in side elevation thereof;

Fig. 3 is a view in end elevation of my new and improved snubber plate, and

Fig. 4 is a vertical sectional view through the snubber plate, taken on the line IV—IV of Fig. 1.

As has already been stated, my invention is particularly applicable to fractional horse-power alternating-current motors in which the torque is not uniform so that the frame will have a tendency to oscillate angularly relatively to the axis of the shaft. If this is not prevented or reduced, it is possible that such vibrations or oscillations may be transmitted to the support, and if this support is of such a character as to have a "sounding board" effect, the resultant noise may be so great as to substantially prohibit the use of the motor in such an application and surrounding.

It has, therefore, been suggested that angular vibrations or oscillations of the motor stator housing or casing may be permitted by a resilient mounting in the form of a pair of spring members, each of substantially U-shape, located at each end of the stator structure. In an assembly of this kind I have found, however, that if the substantially radially extending legs of each of the springs of substantially U-shape are made thin or resilient enough to produce the proper effect of reducing the transmission of the angular oscillations to a support, there may be a tendency under certain conditions of shipment or of operation to break these relatively thin leaf spring portions, and the particular object of my invention is to prevent this, insofar as it may be possible.

Referring to Figs. 1 and 2 of the drawing, I have there illustrated a motor housing 11 which is indicated generally only and is intended to be representative of any kind of motor, particularly an alternating-current electric motor, which, because of its design and operating conditions, may have a tendency to oscillate angularly relatively to the shaft axis. The housing is provided in the usual manner with end bearing brackets indicated generally by numerals 13 and 15, respectively, it being understood that a suitable stator and stator winding, not specifically shown in the drawing, are located within the housing 11. A rotor structure is rotatably supported by the bearing brackets 13 and 15 and is indicated generally by a shaft 17 projecting from a bearing in the bearing bracket 13.

A base 19, which may be of pressed sheet steel, is provided for the motor and may be of such construction as to have an intermediate depressed portion slightly spaced from the motor housing and conforming in shape thereto, in order that the distance from a supporting surface on which the frame 19 may be located, to the center of the shaft may be as small as practically possible.

At each side of each end of the motor I have provided the base 19 with angularly inclined flat surfaces 21 against which the ends of the leg portions of resilient springs 23 of substantially inverted U-shape are adapted to be secured as by bolts or rivets 25, a small pressure plate 27 being also utilized.

The intermediate portion of each resilient spring member 23 may be made substantially flat and horizontal and be secured against resilient bumpers or washers 29, which may be made of rubber, one surface of which may operatively engage the under surface of a bearing housing 31 of the corresponding bracket. It is one of the essential conditions for the proper operation of the spring members 23 that the leg portions thereof extend substantially radial to the axis of the shaft 17 and this is indicated particularly in Fig. 1 of the drawing.

The devices particularly embodying my invention include snubber plates 33, located within the respective spring members 23, of substantially frusto-pyramidal shape, the front and bottom sides being omitted. Each snubber plate 33 has a vertically extending rear plate portion 35 and a flange portion 37, which flange portion is of substantially inverted U-shape, the intermediate part thereof being substantially and horizontally flat, while the downwardly-extending leg portions 39 and 41 thereof are slightly arcuate in shape as is also the lower side portions (particularly as seen in Figs. 1 and 3 of the drawing) of plate 35. As a result the intermediate flat portions of the corresponding snubber plates 33 and spring members 23 closely interfit, and the bends in flange portions 37 also closely rest within the corresponding bends in spring members 23. However, while flanges 39 and 41, immediately below these bends are in operative engagement with the leg portions of springs 23, the lower portions thereof curve slightly away from the springs. It is to be further noted that the bottom edge 43 of each snubber plate 33 is located a short distance above separate flattened intermediate parts 44 of base 19, as may be seen by reference to Fig. 1 of the drawing.

It is obvious that a motor assembly of the kind just described will have its angular oscillations centered around the axis of the rotor shaft, but the conditions will be somewhat different in the case of a capacitor motor in which a capacitor assembly is mounted on the motor housing substantially as shown in the drawing.

A casing 51, of suitable shape and dimensions has located therein an auto-transformer 53 and a condenser 55, electrical connections between the auto-transformer, the condenser and the energizing winding of the motor being made by conductors 57 extending therebetween, other leads 59 being brought out through the motor housing to permit of connecting the motor-energizing winding to a source of supply of electric energy.

The casing 51 is mounted on and supported by resilient strips 61, which may be of substantially Z-shape, the respective end portions of each strip being rigidly secured to the motor casing and to the casing 51. Means to limit the angular oscillation of the strip 61 may comprise stop plates 63, of substantially L-shape and of relatively stiff metal, located as shown in Fig. 1 of the drawing. This mounting of the capacitor assembly permits the resiliently supported motor to oscillate angularly relatively to its own supporting base and also relatively to the capacitor assembly. It is obvious, however, that such a structure, that is, a motor having a capacitor assembly mounted thereon at its top or side, is not symmetrical about the axis of the shaft and in case the motor is subjected to shocks resulting in a movement of the motor at right angles to the axis of the shaft, this unbalance results in a rotational torque about the axis of the shaft which may be violent enough to break the motor-supporting springs, if the snubber plates 33 were not provided. Troubles of this kind occur especially during shipment of the motors but the addition of a snubber plate 33 as disclosed in the present application has effectively prevented breakage of the springs 23.

In case of shock on the motor assembly, as during shipment, with resultant movement of the motor itself, the arcuate flange surfaces 39 and 41 will tend initially to prevent undue turning movement of the motor frame because of their effect of shortening the active length of the legs of springs 23 or in other words, their tendency is to increase the stiffness of these legs. It is obvious that oscillations will be resisted with a force which increases with the degree or amount of oscillation. If, however, the turning movement is extreme the corners or the edge 43 of snubber plate 33 will engage part 44 of base frame 19 and act as a positive stop against further turning movement of the motor housing 11.

As indicated above, it has been found that, whereas small or fractional horse-power motors were prior to the use of the present invention, received in damaged condition after shipment, that is, the springs 23 were broken, the use of snubber plates 33, as shown, has entirely overcome such breakage during shipment and has also prevented breakage of the springs after the motors thus equipped had been put into actual operation.

Various modifications may be made in the device embodying my invention, without departing from the spirit and scope thereof, and I desire, therefore, that only such limitations shall be placed thereon as are imposed by the prior art or are set forth in the appended claims.

I claim as my invention:

1. In a motor assembly comprising a motor housing subjected to angular oscillations during operation, a base and a substantially U-shaped spring member having its intermediate portion connected to the motor housing and the outer ends thereof secured to the base, a single piece snubber plate movable with the motor housing, having one portion of arcuate shape to engage one leg of the spring member and increase its stiffness upon movement of the motor housing in one direction and having another portion adapted to engage the base upon predetermined further movement of the motor housing.

2. In a motor assembly comprising a motor subjected to angular oscillations, a base, and a leaf spring structure extending between the base and the motor, to support the motor on the base and permit the motor to oscillate relatively to the base, a snubber plate secured to the motor to oscillate therewith located between the leaf spring structure and the base and having an arcuate flange portion adapted to engage the leaf spring structure at different points therealong upon oscillation of the motor, to cause the leaf spring structure to resist the oscillations with a force increasing with the degree of the oscillation and having also a portion adapted to engage the base and acting as a positive stop in case of excessive oscillation of the motor.

3. In a motor assembly comprising a motor housing subjected to angular oscillations during operations, a base and a substantially U-shaped leaf spring supporting the motor housing on the base, a snubber plate located between the leaf spring and the base and secured to one of said members, having a pair of arcuate flange portions adapted to engage the respective leg portions of the leaf spring at different points therealong upon oscillation of the motor housing to increase the stiffness of the leaf spring and its resistance to oscillations of the motor housing and having also an edge portion adapted to engage the base frame and act as a positive stop in case of excessive oscillations of the housing.

CLINTON R. BOOTHBY.